Jan. 8, 1957     F. H. GRAHAM     2,776,827
METHOD OF ALTERNATE LOW AND HIGH FUEL FIRING
OF A SOAKING PIT FURNACE
Filed June 24, 1953     3 Sheets-Sheet 1
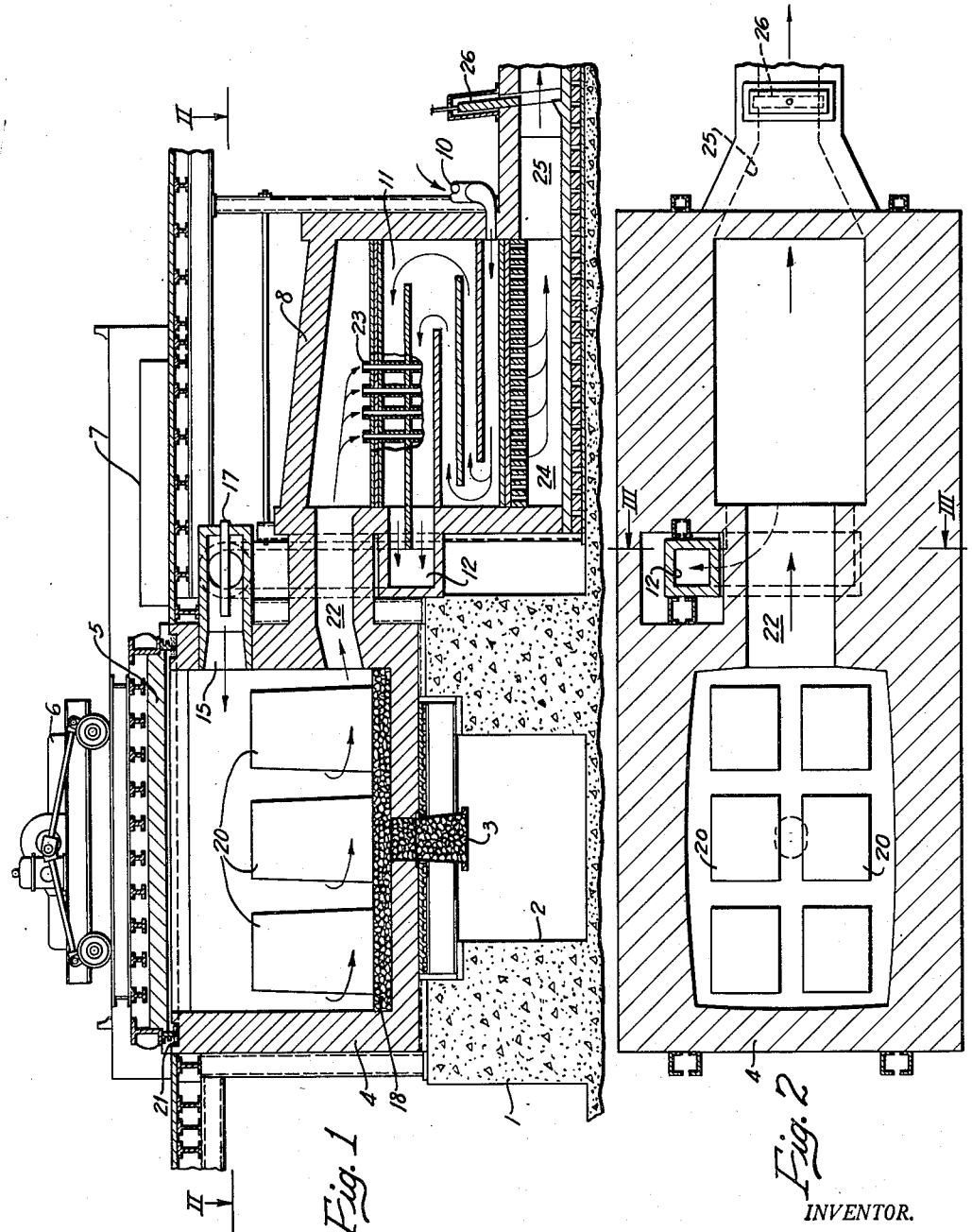
INVENTOR.
FRANK H. GRAHAM
BY William D. Carothers
HIS ATTORNEY

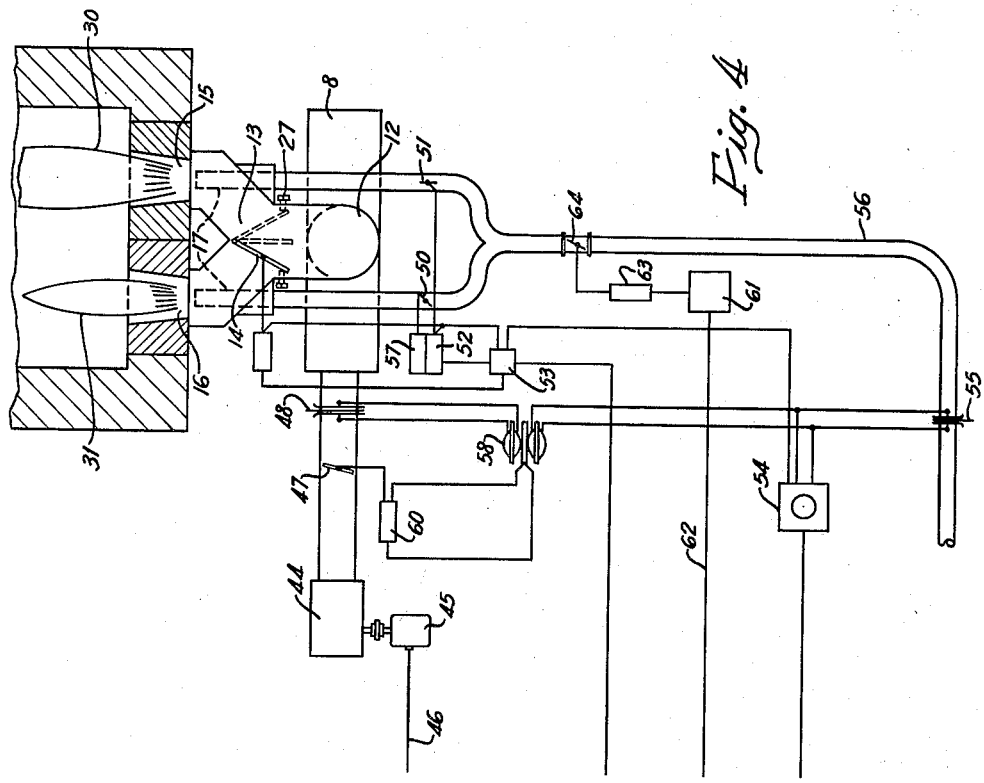
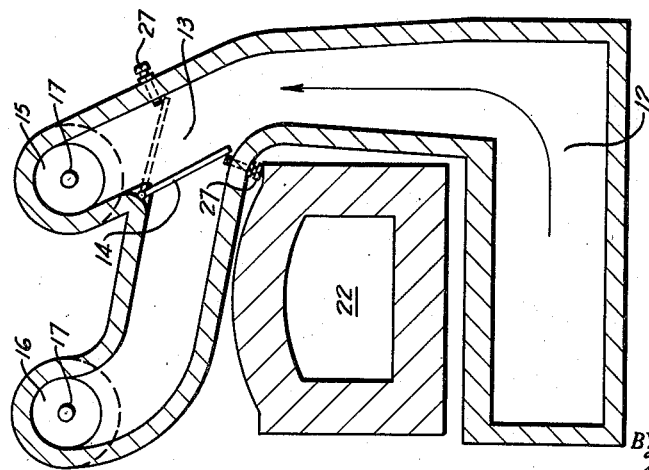

Jan. 8, 1957  F. H. GRAHAM  2,776,827
METHOD OF ALTERNATE LOW AND HIGH FUEL FIRING
OF A SOAKING PIT FURNACE
Filed June 24, 1953  3 Sheets-Sheet 3
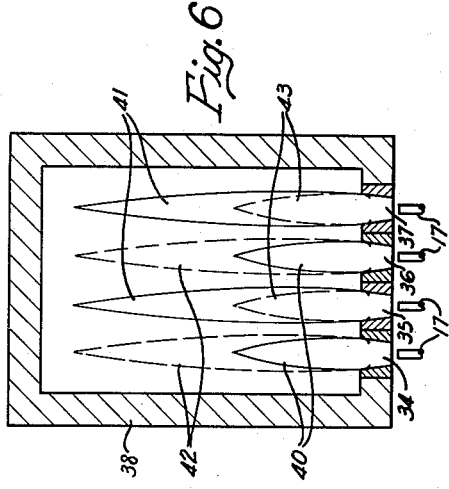
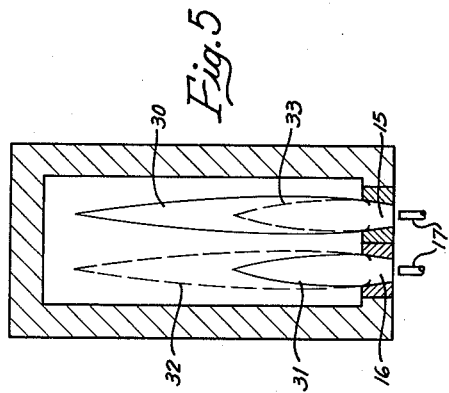
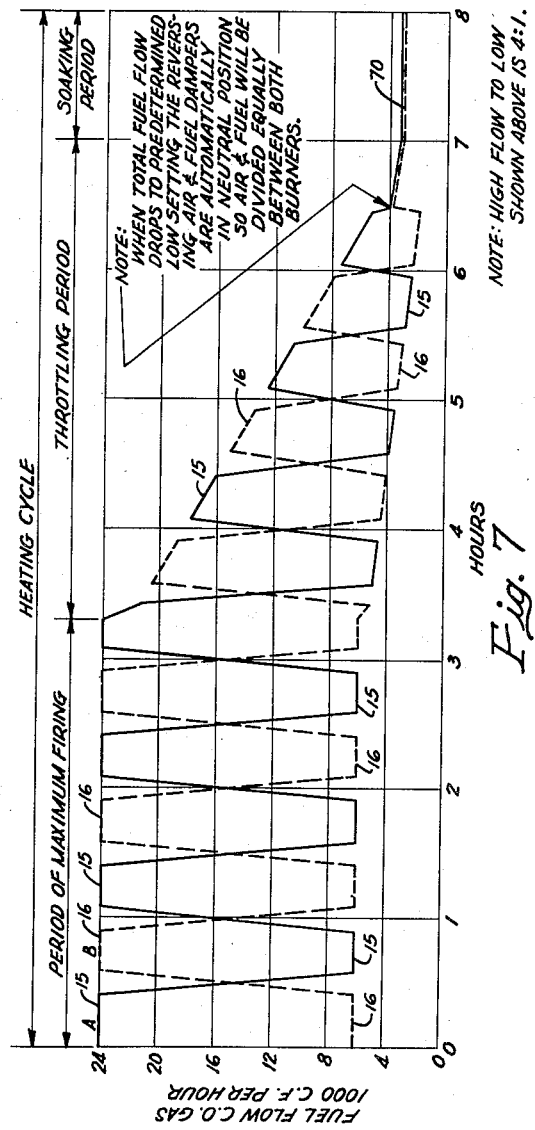
*INVENTOR.*
FRANK H. GRAHAM
BY William D. Carothers
*HIS ATTORNEY*

United States Patent Office 2,776,827
Patented Jan. 8, 1957

2,776,827

METHOD OF ALTERNATE LOW AND HIGH FUEL FIRING OF A SOAKING PIT FURNACE

Frank H. Graham, Edgewood, Pa., assignor to Amsler Morton Corporation, Pittsburgh, Pa., a corporation of Delaware Application June 24, 1953, Serial No. 363,870

3 Claims. (Cl. 263—52)

This invention relates generally to the method of firing heating furnaces and more particularly to the method of firing with alternate low and high fuel flames to more uniformly distribute the heat.

In the firing of heating furnaces that have a relatively large furnace chamber the problem of uniformly heating the chamber and the objects therein is difficult with the present methods. Furnaces of this type eventually come up to heat but a longer period of time is required to make the heat uniform throughout the furnace chamber and in some instances they never attain heat uniformity. This is particularly true for furnaces fired from one side due to the fact that the recuperator is on one side and must supply the air for the burners.

The method of firing by alternating two or more heating flames from a low fuel content to a high fuel content and back again produces a uniform application of heat in all parts of the furnace chamber and provides a continuous pulsation of the heat as applied to the whole of the chamber. The quantity of heat applied to alternate areas in the chamber is changed from a minimum to a maximum quantity and back. This constant change in alternate firing produces a uniform increase in the temperature throughout the chamber and increases the whole of the chamber uniformly until it reaches a predetermined temperature which represents the end of the firing period. The alternate flame firing method continues but the maximum quantity of heat is gradually reduced. This is the throttling period. The minimum quantity of heat during these alternate flames may or may not be reduced at the same time. Generally the minimum heat supplied during these alternate flames is higher than the maximum heat quantity required during the soaking period which is the third period in the heating cycle. The soaking period requires only that amount of heat to maintain the furnace loses and keep the articles at the soaking temperature.

When the maximum quantity of heat supplied by the alternate flames approximates the amount of heat required for the soaking period the minimum heating flames are materially lower and a transition is made to equalize the supply of heat through all of the flames and thus eliminate alternate firing during this third or soaking period during which a minimum heat is supplied.

By following this method of heating the furnace, the firing period and the throttling period are reduced in time because the whole of the furnace chamber rises in temperature uniformly. This alternate flame firing by two or more flames for short periods of time produces heat impulses in different parts of the furnace chamber providing more action and better distribution of the heating gases. This induces uniformity in the heating of the articles and in the furnace chamber.

A soaking pit may have two or more burners in one wall. Two burners operate very well on one recuperative type heat exchanger by employing a reversing valve to alternately supply heated air to one burner at a time. This valve never shuts off all the air to the alternate burner as it is necessary to provide for the low minimum flame or a pilot light or a less intense flame than the burner that is firing at a maximum rate.

Regardless of the alternate firing the total fuel and heated air supplied for combustion is proportioned and also regulated in accordance with the temperature conditions within the furnace. The alternate firing feature may be controlled by a timer which regulates the flow of fuel and air to alternate burners at equal predetermined periods of time. When the furnace responds properly in heating and comes up to heat during the firing period the alternate feature of the control continues but the total fuel diminishes to below the minimum heat supply of the former period and the soak period then commences with all burners functioning to equally supply the heat losses of the furnace and permit the articles to soak in the heat until they are needed for rolling or what other work is to be performed thereon. When the furnace is opened to remove the articles, the burners operate with a pilot light and as soon as the furnace is closed the controls again reheat the furnace in accordance with its needs. The controls may have to follow a complete heating cycle or the burners may have to fire at a higher rate to supply the small loss and then subsequently drop to the soaking period operation to again maintain the soaking period heat.

Better combustion and better distribution of heat in the pit furnace results in this mode of heating by alternating the firing flames. This results in an improved heating cycle.

Other objects and advantages appear hereinafter in the following description and claims.

The accompanying drawings show for the purpose of exemplification without limiting the invention or claims thereto, certain practical embodiments illustrating the principles of the invention wherein:

Fig. 1 is a view in vertical section of a soaking pit furnace provided with two burners from one side wall thereof and being supplied with heated air from a recuperator.

Fig. 2 is a sectional view taken along the line 2—2 of Fig. 1.

Fig. 3 is a sectional view taken along the line 3—3 of Fig. 2.

Fig. 4 is a diagrammatic view of the control apparatus for firing the furnace as illustrated in Figs. 1 to 3.

Fig. 5 is a diagrammatic view illustrating the maximum and minimum flames employed in the alternate firing process with two burners.

Fig. 6 is a diagrammatic view of soaking pit furnace being supplied with heat from four burners of which the flames are shown in alternate positions following the teachings of the method of this invention.

Fig. 7 is a graph showing the operating cycle following the method of alternate firing flames comprising this invention.

Referring to Fig. 1 of the drawings, the soaking pit is mounted on a foundation 1 which is chambered in the center as indicated at 2 for the purpose of cleaning out the pit from the central plugged opening as shown at 3. The pit furnace proper is illustrated by the walls 4 and its chamber is closed by the cover member 5 so that it may be raised by the cover carriage 6 and moved to the storing position on the platform 7 above the recuperator 8. The recuperator 8 is provided with an air inlet 10 which supplies air through the horizontal passages indicated at 11 and which finally arrive at the hot air inlet passage 12 which extends upwardly to the Y-joint 13 controlled by the valve member 14 for controlling the supply of air to the burners 15 and 16 for supporting combustion. Each of these burners is provided with a fuel nozzle 17.

The soaking pit furnace may be provided with a prepared bottom which includes coke breeze as indicated at 18. The pit contains six ingots indicated at 20. The ingots are placed on the bottom of the soaking pit and when the carriage may be moved to lift the cover 5 and partially open the pit to remove or load the same, lifts the cover from the pit sand seal as indicated at 21 and moves the same to the platform as shown at 7. A mechanical device is lowered into the furnace to remove one of the ingots for the purpose of rolling or otherwise working the same, and the cover is then replaced.

The flame is supplied to the furnace chamber and passes to the opposite wall thereof and loops back and the products of combustion are discharged from the common discharge port or flue 22 which again returns to the recuperator 8 and passes down the series of tubes as illustrated at 23 to the lower chamber as illustrated at 24 in the bottom of the recuperator where the exhaust gas is passed through the flue 25, past the valve 26 to a stack.

The valve 14 in the Y 13 of the air supply is provided with a stop on either side thereof as illustrated in 27. These stops prevent the valve 14 from completely blocking off the passages of air to the alternate burner so that regardless of which burner is supplying the majority of heat to the furnace, the other burner is likewise supplied with sufficient amount of air for supporting combustion of the minimum amount of heat it supplies to the furnace chamber. Thus the adjustable screw 27 may be regulated by the control circuit to determine the minimum air supplied by each one of the burners during the maximum firing period of the alternate burner.

As shown in Figs. 4 and 5, the burner 15 is supplying the greater amount of fuel as indicated by the flame 30 and the burner 16 is supplying the minimum amount of fuel as indicated by the flame 31. This matter of alternate firing with full flame is retained for predetermined periods of time which may be calculated in minutes or portions of an hour. Once the timer is set the periods are usually maintained uniformly. The apparatus is actuated to alternate or change the sequence to permit the burner 16 to have the full flame as indicated at 32 in Fig. 5 in dotted lines and the burner 15 then fires with minimum flame as indicated in 33 in Fig. 5.

A similar arrangement is illustrated in Fig. 6 wherein there are four burners 34, 35, 36 and 37, each supplied with fuel from the pipe line such as indicated at 17 and as shown herein a similar control and conductor arrangement is made for supplying fuel and air to this soaking pit furnace indicated at 38 for the purpose of operating the burners so that the burners 34 and 36 are firing a minimum flame as indicated at 40 and the burners 35 and 37 are operating with a maximum flame as indicated at 41. On the next phase of the firing operation the burners 34 and 36 will fire a maximum flame such as indicated at 42 and the burners 35 and 37 will operate on a minimum burning flame as indicated at 43.

Referring again to Fig. 4 it will be seen that the air is supplied to the recuperator, which is indicated at 8, by means of the blower member 44 and operated by the motor 45 and controlled through a conveniently controlled source of power as indicated at 46. The total supply of air is of course controlled by the damper 47 and is measured as it passes through the metering orifice 48 to the heat exchanger indicated by the recuperator 8 and thence it passes up its passageway 12 until it comes to the Y 13 from whence the valve member 14 shifts from one side to the other as illustrated according to which burner is set to fire the maximum fuel and the other burner which is set to fire the minimum fuel. As illustrated the adjustably controlled member 27 prevents the valve from fully closing so as to provide a sufficient amount of air to the minimum fuel burner.

The fuel pipes 17 are each controlled by the valve members 50 and 51 which in turn are operated by the servomotor 52. These fuel reversing valves likewise pass a sufficient amount of fuel for the minimum flame and also are capable of being adjusted automatically by the servomotor 52 during the soaking period to reduce the minimum supply of fuel to the burners. The valve operating servomotor 52 is in turn controlled from the timer member 53 which determines those portions of the cycle in which the maximum firing is alternated from the burner 15 to the burner 16 and this timer is likewise controlled through the fuel flow meter as indicated at 54 which obtains part of its control from the pressure on both sides of the orifice 55 in the fuel line 56 which is likewise effective on the regulator 57 that operates in conjunction with the air regulator 58 for controlling the operation of the valve operating mechanism 60 that is employed to control the air valve member 42. Thus the fuel and air are both properly proportioned for the complete operation of the heating cycle.

The temperature control pyrometer structure is shown at 61. This member gains its controls through the line 62 and functions through the valve operating servomotor 63 to operate the fuel valve 64 which represents the main valve which controls the supply of fuel to the furnace in accordance with the operations thereof. Each of these members, namely the air supplying motor 45, the timer 53, the temperature controlled pyrometer 61 and the fuel flow meter 54, is provided with control lines that are connected with an integrating device that permits them to be independently controlled and also controlled to function in the manner as illustrated in the graph shown in Fig. 7.

Referring specifically to Fig. 7, it will be noted that the maximum fuel is supplied through the burner 15 as illustrated at A and at the same time a minimum supply of fuel is provided through the burner at 16. When the timer determines that the alternation should be made, the fuel and air are reduced to the burner 15 and the fuel and air to the burner 16 are increased until the burners are reversed for these short alternate periods of the heating cycle as illustrated in the graph. This continues alternately as indicated until the total firing period of the heating cycle has been realized as shown in the graph, this is the period of maximum firing and the firing has been alternately from both burners. In each instance the flame is required to pass outwardly into the furnace chamber and turn downwardly past and around the ingots and to the discharge opening 22. At the end of the heating or the maximum firing period, the following or throttling period commences to gradually reduce the supply of fuel and air to the burners. This is of course governed by the temperature controls through the servomotors, particularly servomotor 63 and its valve 64 and also in combination with the valves 50 and 51. As shown in the graph, the total amount of heat is reduced along a definite curve until the end of the throttling period which is approximately less than three hours as compared with the maximum firing period which is approximately three hours. However, it will be noted that the minimum firing has been reduced to a point lower than the minimum firing during the firing period. In the reduction of this supply of fuel there is of course an equal reduction in the supply of air so that the regulator of fuel and air properly maintain the needed proportion between the fuel and air for the purposes of good combustion and proper heating of the furnace.

At the close of the throttling period the servomotor 52 which is controlled by the timer 53 adjusts the valve members 50 and 51 to supply equal amounts of fuel, the total amount of fuel being of course regulated by the valve member 64. This causes the curve to follow in the uniform supply of heat from both burners which was indicated at 70 on the graph Fig. 7 which is sufficient to maintain all of the heat losses of the furnace and permit a definite soaking of the ingots which may be for a considerable period of time depending upon when the steel is to be run, a breakdown, or upon other conditions that are necessarily tied together with the rolling operation.

This method of firing by alternately supplying a maximum fuel through one burner while another burner is supplying a minimum amount of fuel, is used in the soaking pit of this character or may be used in other types of heating furnaces. A pulsation of the heating flames creates a different type of circulation of the heat through the furnace chamber which is conductive to a uniform heating cycle for the articles therein and for producing uniformly heated furnace chamber. In this way the length of the period of maximum firing may be reduced somewhat and may be even reduced to a greater degree than that shown in the graph in Fig. 7. The throttling period may likewise be reduced. It will be noted that the throttling period which is less than three hours presents a rather steep slope in the operating curve.

While for clarity of explanation, certain embodiments of this invention have been shown and described, it is to be understood that this invention is capable of many modifications and changes in the construction and arrangement of parts and certain parts and steps may be employed without the conjoint use of other parts and steps and without departing from the spirit and scope of this invention.

I claim:

1. The method of heating ingots in a soaking pit furnace chamber which comprises simultaneously introducing into the furnace chamber parallel streams of heating media from one side thereof, causing the streams of heating media to loop past the ingots and return to the same side of the furnace chamber, discharging the streams of heating media from adjacent place of their entry and alternately changing the quantity of the heating media introduced in each of the parallel streams and further characterized in that the summation of the quantities of heating media in the parallel streams is substantially constant throughout he firing period.

2. The method of heating ingots in a soaking pit furnace chamber which comprises simultaneously introducing into the furnace chamber parallel streams of heating media from one side thereof, causing the streams of heating media to loop past the ingots and return to the same side of the furnace chamber, discharging the streams of heating media from adjacent place of their entry and alternately changing the quantity of the heating media introduced in each of the parallel streams and further characterized in that the summation of the quantities of heating media in the parallel streams is substantially constant throughout the firing period, and gradually diminished each stream during the throttling period from a maximum supply of heating media to a minimum supply of heating media for the soaking period.

3. The method of claim 2 characterized in that the summation of the minimum supply of heating media is proportioned equally between each parallel stream during the soaking period.

References Cited in the file of this patent

UNITED STATES PATENTS

| | | |
|---|---|---|
| 2,303,620 | Dean | Dec. 1, 1942 |
| 2,317,927 | Loftus | Apr. 27, 1943 |
| 2,414,888 | Morton et al. | Jan. 28, 1947 |

OTHER REFERENCES

Trinks' Industrial Furnaces, volume 1, 3rd edition, copyright 1934, published by John Wiley and Sons, Incorporated, New York, N. Y., pages 391 and 392.